(No Model.) 3 Sheets—Sheet 1.

T. SULLIVAN.
TRANSPLANTER.

No. 461,878. Patented Oct. 27, 1891.

Witnesses
Jas. E. Hutchinson.
G. F. Downing

Inventor
T. Sullivan
By his Attorney
H. A. Seymour (No Model.) 3 Sheets—Sheet 2.

T. SULLIVAN.
TRANSPLANTER.

No. 461,878. Patented Oct. 27, 1891.

Witnesses
Jas. E. Hutchinson.
G. F. Downing.

Inventor
T. Sullivan
By his Attorney
H. A. Seymour (No Model.) 3 Sheets—Sheet 3.
T. SULLIVAN.
TRANSPLANTER.
No. 461,878. Patented Oct. 27, 1891.
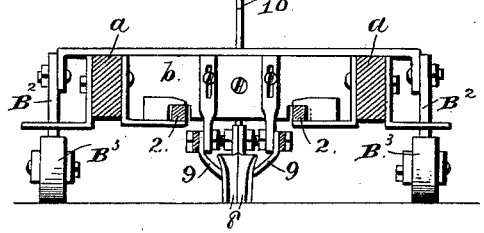
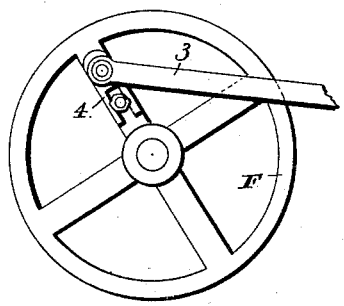
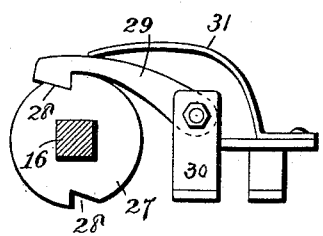
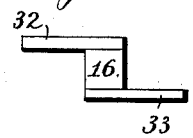
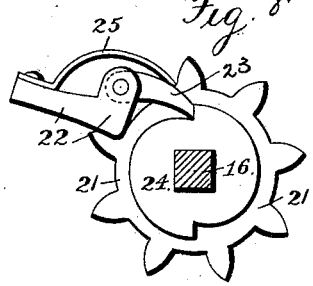
Witnesses
Jas. E. Hitchinson
G. F. Downing
Inventor
T. Sullivan
By his Attorney
H. A. Seymour

UNITED STATES PATENT OFFICE.

TIMOTHY SULLIVAN, OF JANESVILLE, WISCONSIN.

TRANSPLANTER.

SPECIFICATION forming part of Letters Patent No. 461,878, dated October 27, 1891.

Application filed July 14, 1890. Serial No. 358,610. (No model.)

*To all whom it may concern:*

Be it known that I, TIMOTHY SULLIVAN, a citizen of Janesville, in the county of Rock and State of Wisconsin, have invented certain new and useful Improvements in Transplanters; and I do hereby declare the following to be a full, clear, and exact description of the invention, such as will enable others skilled in the art to which it appertains to make and use the same.

My invention relates to an improvement in transplanters; and has for its object to produce a transplanter, by means of which young tobacco-plants or other plants may be automatically and effectually planted.

A further object is to so construct a machine of the class named that a furrow of any desired size may be made in the ground, a plant forced in said furrow, and the furrow closed when the plant is in position.

A further object is to construct a transplanter having fingers and operating mechanism constructed and arranged in such manner that the finger may be kept in continuous operation during the running of the machine.

A further object is to provide a transplanter having planting-fingers, with means for automatically opening and closing said fingers.

A further object is to construct a transplanter having planting-fingers in such manner that said fingers shall have a reciprocating as well as a rotary motion.

A further object is to provide means whereby the planting-fingers shall have reciprocating motion longitudinally of the machine while said machine is moving forward.

With these objects in view the invention consists in certain novel features of construction and combinations and arrangements of parts, as hereinafter set forth, and pointed out in the claims.

Figure 1:
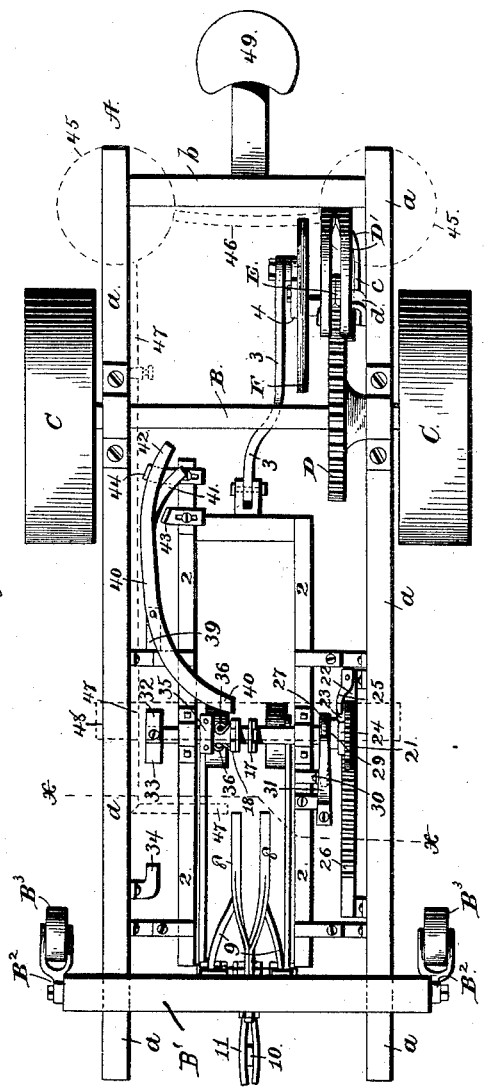
Figure 2:
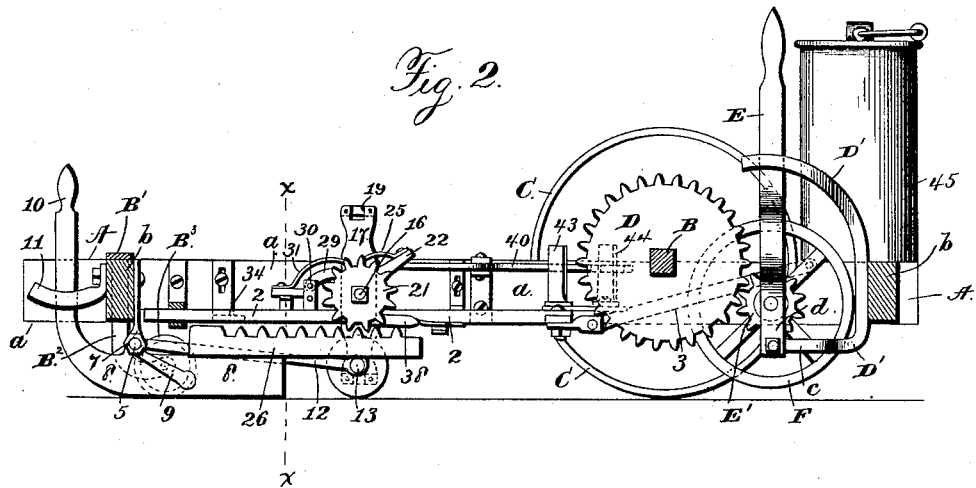
Figure 3:
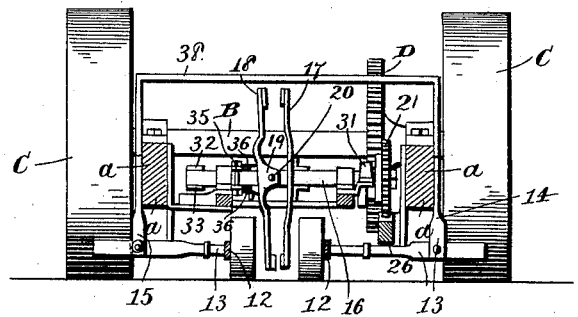

In the accompanying drawings, Figure 1 is a plan view of my invention. Fig. 2 is a side elevation with part of frame removed. Fig. 3 is a sectional view on the line $x\ x$ of Fig. 1. Fig. 4 is a sectional view on the line $x\ x$ of Fig. 2. Figs. 5, 6, 7, and 8 are detail views.

A represents a suitable frame-work, which may consist of longitudinal timbers $a\ a$ and end connecting-timbers $b\ b$. A shaft B is mounted in suitable bearings near the rear end of the frame, and secured to the ends of this shaft are the main drive and supporting wheels C C. A bar B' extends across the forward end of the frame A and extends beyond the longitudinal timbers $a\ a$. Secured to the ends of the bar B' are brackets B² of caster-wheels B³, by which the forward end of the machine is supported. A gear-wheel D is also secured to the shaft B within the frame A, and secured to the frame in rear of this gear-wheel is a bracket D', having a bifurcated lower end to produce arms $c\ c$ and being also bifurcated at its upper end to produce a guide for an operating-lever E. The lower end of the lever E is bifurcated to produce two arms $d\ d$, which arms are pivotally connected at their lower extremities to the arms $c\ c$ of bracket D'. Journaled in the arms $d\ d$ of lever E is a pinion E', adapted to mesh with the gear-wheel D, the shaft of said pinion being extended beyond its bearings, and has fixed at or near its free end a wheel F. Mounted in bearings 1, secured to the longitudinal timbers $a$, is a longitudinally-reciprocating carriage 2, connected at its rear end with the wheel F by means of a pitman 3. In order to regulate the extent of reciprocation of the carriage 2 the pitman 3 is adjustably connected to the wheel F by means of a slotted plate 4, adjustably secured to said wheel, to which plate the pitman is secured. By manipulating the lever E the pinion may be brought into mesh with the gear-wheel D on the main shaft, and thus a reciprocating motion imparted to the carriage 2 through the medium of the wheel F and pitman 3.

At the forward end of the machine a shaft 5 is revolubly mounted in depending plates 7, and pivotally connected to this shaft is a shoe 8, having diverging blades for cutting a furrow in the ground as the machine advances, the blades of said shoe being guided by means of arms 9, secured to the shaft 5. The handle 10 of the shoe 8 extends upwardly at the forward end of the machine and passes between two spring-plates 11, secured to the frame A. By manipulating the handle of the shoe the blades of the shoe may be made to enter the ground to a greater or less extent and the width of the furrow thereby regulated. Also connected to the shaft 5 are two rods 12 12, which extend rearwardly to a point about the center of the carriage 2 when said carriage is in the rearward extremity of its movements. The free ends of the arms 12 are provided with eyes for the reception of short shafts 13, carrying presser-wheels, said wheels being thus located at opposite sides of the longitudinal axis of the carriage 2. The shafts 13 are supported by brackets 14 15, secured to the longitudinal timbers, the brackets 15 and shaft 13 being secured together by means of screw-bolts, by loosening which said presser-wheels may be readily adjusted relatively to the ground.

Revolubly mounted on the carriage 2 at or near its center is a shaft 16, preferably made square in cross-section, except at its bearings on the carriage, and made to project beyond its bearings at both ends. The shaft carries at its center a pair of double-ended planting-fingers 17 18, each being provided at its opposite ends with recessed heads, and over the recess in said heads strips of leather or other soft material are secured. The planting-finger 17 is rigidly secured to the shaft 16 near its center, while the perforation through the center of the finger 18 is made somewhat larger than the shaft 16, and this finger is provided with ears 19, through which a pin 20 passes, and thus pivotally connects the finger 18 to the shaft 16. On one end of the shaft 16 a pinion 21 is loosely mounted and carries an L-shaped arm 22, to which a dog 23 is pivoted. The dog is adapted to engage the teeth of a wheel 24, secured on the shaft 16, and is maintained in contact with said wheel by means of a flat spring 25. The wheel 24 is provided with two teeth, one diametrically opposite the other, so that the pinion 21 will be locked to the shaft when rotated in one direction and free to turn on said shaft when rotated in the other direction. A rack-bar 26 is secured to one of the longitudinal timbers a of frame A and is adapted to mesh with the pinion 21, so that when the carriage 2 is moved forward and the pinion locked to the shaft 16, as above explained, the planting-fingers will move forward with the carriage and make one-half revolution; but when the carriage recedes the pinion 21 will rotate freely on the shaft 16 and the fingers will recede without rotating. To prevent the shaft 16 from rotating during the rearward movement of the carriage, a disk 27 is fixed to said shaft and provided with diametrically-opposite notches 28, adapted to be engaged by a dog 29, pivoted in a bracket 30 on the carriage 2, said dog being maintained in contact with the wheel by means of a spring 31, secured to one arm of the bracket 30. When the carriage 2 moves forward, the dog 29 will recede over the periphery of disk 27; but when the carriage moves rearwardly said dog will engage in one of the notches 28 and prevent the rotation of the shaft 16. At the opposite end of the shaft from that on which the mechanism just described is located two arms 32 33 are fixed and project laterally therefrom in opposite directions, said arms being adapted to alternately engage a bracket 34, fixed to and projecting from the main frame A, whereby the shaft will be caused to make but one-half revolution at each forward movement of the carriage.

A small rectangular frame 35 is secured to the shaft 16 in proximity to the pivoted finger and serves to hold secure two springs 36 36, one above and the other below, and serves to periodically hold the heads of fingers together or, more properly speaking, to clamp a plant between said fingers. These springs are released from the pivoted finger by engagement with an arm 38, secured to the main frame, when the carriage reaches the extremity of its rearward throw.

Pivotally supported by an arm 39, secured to the main frame, is a curved lever 40, one end terminating in proximity to the rearward throw of the pivoted planting-finger and the other end terminating in two curved portions 41 42. This bifurcated end of the lever 40 operates between two arms 43 44, adjustably attached to the carriage 2. With this construction when the fingers reach the rearward extremity of their throw the arm or portion 41 of lever 40 will engage the arm 43 and the forward end of said lever will be made to engage the pivoted finger, causing one end of the fingers to open and the other end to close. When the fingers again move forward, the arm 44 will engage the lever 40 and move it entirely out of line with the fingers.

Located on the rear end of the frame A are water-tanks 45, connected together by a suitable pipe 46. A pipe or tube 47 is connected to one of the tanks 45 and extends to the rear end of the shoe 8, whereby the plants being planted may be watered, the supply of water being regulated by means of a suitable cock.

At the rearward extremity of the throw of the planting-fingers a guard-bar 48 is secured to and extended across the machine, said bar being made adjustable, whereby it may be adjusted relatively to the planting-fingers.

A seat 49 is located at the rear end of the machine, where an operator is located to manipulate the lever E to throw the mechanism into and out of gear.

With the parts in the positions shown in Fig. 1 a plant is placed between the planting-fingers, leaves down, the lever E manipulated to throw the operating mechanism into gear with the driving mechanism, and the machine started. The fingers will first move rearwardly a short distance, when the pivoted finger will be engaged by the lever 40, the fingers made to clamp the plant, and maintained in this position by one of the springs 36. As the machine moves forward the carriage will be propelled, as hereinafter explained, carrying the fingers forward, and by means of the ratchet mechanism on shaft 16 and the rack-bar 26 and pinion 21 the fingers will be caused to make a half-revolution and insert themselves in the furrow between the blades of the shoe 8. When the fingers shall have again assumed a vertical position, the carriage will move rearwardly (the fingers maintaining their vertical position) until the lever 40 is nearly reached, at which time another plant will be inserted between the heads at the opposite ends of the fingers. By engagement of the spring 36, now beneath the shaft 16, with the arm 38 said spring will be released from the pivoted finger and the plant left in the furrow, whereupon the pressure-rollers will close the ground around the roots of the plant. At the same time that the fingers release one plant the other end of the pivoted finger will be engaged by the lever 40 and clamp a plant between them. As the machine moves forward this operation is repeated, a plant being placed between the upper ends of the fingers just before they reach the rearward extremity of their throw.

Instead of one set of planting-fingers, the machine may be provided with several sets.

It will be observed that the machine always moves forward during both the forward and backward movements of the planting-fingers.

Slight changes might be made in the constructive details of my invention without departing from the spirit thereof or limiting its scope. Hence I do not wish to limit myself to the precise details of construction herein set forth; but, Having fully described my invention, what I claim as new, and desire to secure by Letters Patent, is—

1. In a transplanter, the combination, with a frame, of a reciprocating carriage in said frame, a shaft mounted on the carriage, planting-fingers carried by said shaft, gearing for reciprocating the carriage, and devices for rotating the fingers when the carriage moves, substantially as set forth.

2. In a transplanter, the combination, with a frame, of a reciprocating carriage in said frame, a shaft mounted on the carriage, planting-fingers carried by said shaft, gearing for reciprocating the carriage, devices for rotating the fingers when the carriage moves in one direction, and devices for preventing the rotation of said fingers when the carriage moves in the other direction, substantially as set forth.

3. In a transplanter, the combination, with a frame and a main driving-shaft carrying wheels, of a reciprocating carriage in said frame, rotary fingers carried by said carriage, a gear-wheel on the main driving-shaft, a pinion meshing with said gear-wheel, a wheel on the shaft of said pinion, and a pitman connecting said wheel with the carriage, substantially as set forth.

4. In a transplanter, the combination, with a frame and the main driving-shaft carrying wheels, of a reciprocating carriage in said frame, rotary fingers carried by the carriage, a gear-wheel on the main driving-shaft, a pinion meshing with said gear-wheel, a wheel on the shaft of said pinion, and a pitman adjustably connected at one end to said wheel and at the other end to the carriage, substantially as set forth.

5. In a transplanter, the combination, with a frame and the main driving-shaft carrying wheels, of a reciprocating carriage in said frame, rotary fingers carried by the carriage, a gear-wheel on the main driving-shaft, a bracket carried by the main frame, a lever pivotally connected to said frame, a pinion carried by said lever and adapted to mesh with the gear-wheel on the main shaft, a wheel on the shaft of said pinion, and a pitman connecting said wheel with the reciprocating carriage, substantially as set forth.

6. In a transplanter, the combination, with a frame, of a reciprocating carriage, mechanism for operating said carriage, a shaft mounted on the carriage, planting-fingers carried by said shaft, a pinion on the shaft, and a rack-bar on the main frame, with which said pinion is adapted to engage, substantially as set forth.

7. In a transplanter, the combination, with a frame, of a carriage mounted therein, mechanism for reciprocating said carriage, a shaft mounted on the carriage, planting-fingers carried by said shaft, a pinion loosely mounted on the shaft, a dog for locking said pinion to the shaft when the carriage moves in one direction, and a rack-bar secured to the main frame, with which said pinion is adapted to mesh, substantially as set forth.

8. In a transplanter, the combination, with a main frame, of a carriage mounted thereon, mechanism for reciprocating said carriage, a shaft mounted on the carriage, planting-fingers carried by said shaft, a pinion loosely mounted on the shaft, a notched wheel and a pivoted dog for locking the pinion to the shaft when the carriage moves in one direction and a notched wheel and pivoted dog for preventing the shaft from rotating when the carriage moves in the other direction, and a rack-bar carried by the main frame, with which said pinion is adapted to mesh, substantially as set forth.

9. In a transplanter, the combination, with a reciprocating frame, of a shaft mounted thereon, two fingers carried by said shaft, one of said fingers being fixed and the other pivotally connected to said shaft, and mechanism for operating said fingers, substantially as set forth.

10. In a transplanter, the combination, with a reciprocating carriage, of a shaft mounted thereon, two fingers carried by said shaft, one finger being fixed and the other pivotally connected to the shaft and both fingers being provided with a head at each end, and mechanism for reciprocating the carriage and rotating the fingers, substantially as set forth.

11. In a transplanter, the combination, with a reciprocating carriage, of a shaft mounted thereon, planting-fingers carried by the shaft, mechanism for reciprocating the carriage and rotating the shaft, a lever having a bifurcated end pivotally connected to the main frame, and arms secured to the carriage on opposite sides of the lever, whereby said lever is made to engage one of the planting-fingers when the carriage moves in one direction, substantially as set forth.

12. In a transplanter, the combination, with a reciprocating carriage, of a shaft mounted thereon, planting-fingers carried by the shaft, one fixed and the other pivotally connected, mechanism for rotating the carriage, a lever having a bifurcated end pivotally connected to the main frame, arms secured to the carriage on opposite sides of the lever, whereby said lever is made to engage one of the planting-fingers to clamp said fingers together when the carriage moves in one direction, springs, carriage, and bearing on one of the fingers to maintain said fingers closed, and a bracket secured to the main frame, with which said springs are adapted to engage to release the fingers, substantially as set forth.

13. In a transplanter, the combination, with a main frame and carriage, of an adjustable shoe having an operating-lever, a bracket to receive said lever, and adjustable arms adapted to embrace the shoe and form guides therefor, substantially as set forth.

In testimony whereof I have signed this specification in the presence of two subscribing witnesses.

TIMOTHY SULLIVAN.

Witnesses:
M. G. JEFFRIS,
W. BLADON.